US006922224B1

United States Patent
Penry et al.

(10) Patent No.: US 6,922,224 B1
(45) Date of Patent: Jul. 26, 2005

(54) SILICON-BACKED MICRODISPLAY WITH A GLASS-SIDE PASSIVATION LAYER

(75) Inventors: Matthew Douglas Penry, Morgan Hill, CA (US); Russell Flack, Saratoga, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 09/533,705

(22) Filed: Mar. 23, 2000

(51) Int. Cl.$^7$ .............................................. G02F 1/1333
(52) U.S. Cl. ...................................... 349/138; 349/122
(58) Field of Search ............................... 349/138, 113, 349/158, 122, 123

(56) References Cited

U.S. PATENT DOCUMENTS

| | | | | |
|---|---|---|---|---|
| 5,764,324 A | * | 6/1998 | Lu et al. ...................... | 349/113 |
| 6,143,418 A | * | 11/2000 | Takamiya et al. ............ | 428/434 |
| 6,504,588 B1 | * | 1/2003 | Kaneko ........................ | 349/71 |
| 6,693,694 B2 | * | 2/2004 | Janssen et al. ............... | 349/122 |
| 2001/0003474 A1 | * | 6/2001 | Janssen et al. | |

* cited by examiner

Primary Examiner—Robert H. Kim
Assistant Examiner—Thoi V. Duong
(74) Attorney, Agent, or Firm—Stallman & Pollock LLP

(57) ABSTRACT

A silicon-backed microdisplay with reduced flicker and a protected glass-side conductive layer. The silicon-backed microdisplay includes a silicon die, a silicon-side conductive layer disposed on the silicon die, and a silicon-side passivation layer arranged on the silicon-side conductive layer. The silicon-backed microdisplay also includes a cover glass, a glass-side conductive layer disposed on the cover glass and a glass-side passivation layer of a predetermined material and thickness arranged on the glass-side conductive layer. Liquid crystal material is sandwiched between the glass-side passivation layer and the silicon-side passivation layer in the silicon-backed microdisplay. Visible flicker is suppressed in the microdisplay by selecting a glass-side passivation layer material (for example, $CeO_2$, $In_2O_3$, $MgO$, $SnO_2$, $Ta_2O_5$, $TiO_2$, $Y_2O_3$, $ZnO$, $SiO_2$, $Al_2O_3$, $BeO$ or $MgF_2$) and thickness (for example, in the range of 300 angstroms to 900 angstroms) that improve the work function balance between (i) a combination of the glass-side conductive layer and the glass-side passivation layer and (ii) a combination of the silicon-side passivation layer and the silicon-side conductive layer. The presence of a glass-side passivation layer will also help maintain the work function balance by protecting the glass-side conductive layer surface from exposure to impurities.

5 Claims, 1 Drawing Sheet

SILICON-BACKED MICRODISPLAY WITH A GLASS-SIDE PASSIVATION LAYER

BACKGROUND OF THE INVENTION

1. Field of the Invention

The present invention relates to liquid crystal displays and, in particular, to silicon-backed microdisplays.

2. Description of the Related Art

Conventional liquid crystal displays (LCDs) include two sheets of glass arranged to form a thin cell, which is filled with a liquid crystal material. One of the sheets of glass includes transistors and pixel activation plates on its surface that serve to activate the liquid crystal material at discrete pixel locations. See U.S. Pat. No. 5,299,289 to Omae et al. for a description of conventional LCDs. A silicon-backed microdisplay is essentially a miniaturized LCD with a silicon die substituted for one of the glass sheets. The surface of the silicon die includes the transistors (typically CMOS-based), pixel activation plates, and drive circuitry (e.g. row and column drivers) required for operation of the silicon-backed microdisplay. The pixel activation plates also serve as reflector plates that reflect incoming light back towards a viewer during operation of the silicon-backed microdisplay.

A portion of a representative silicon-backed microdisplay is shown in cross-section in FIG. 1. Silicon-backed microdisplay portion 10 includes a silicon die 12, a silicon-side conductive layer 14 disposed on the silicon die 12, and a silicon-side passivation layer 16 disposed on the silicon-side conductive layer 14. Silicon-backed microdisplay portion 10 also includes a cover glass 18, and glass-side conductive layer 20 disposed on the bottom surface of the cover glass 18. As shown in FIG. 1, a uniform gap is present between the silicon-side passivation layer 16 and the glass-side conductive layer 20. This gap is filled with liquid crystal material 22. The combination of silicon die 12, silicon-side conductive layer 14, silicon-side passivation layer 16, cover glass 18, glass-side conductive layer 20 and liquid crystal material 22 essentially constitutes a miniature reflective mode, silicon-backed microdisplay.

To change the orientation of the liquid crystal material 22 and, therefore, affect the amount of light passing through the liquid crystal material 22, an AC electrical bias is applied between the silicon die 12 and the cover glass 18. Due to the electrical and surface properties of the cover glass 18, glass-side conductive layer 20, silicon-side passivation layer 16, silicon-side conductive layer 14 and silicon die 12, however, the microdisplay can exhibit flicker during operation. Such flicker, if visible to a user, renders the silicon-backed microdisplay unfit for commercial sale.

U.S. Pat. No. 5,764,324 to Lu et al. (hereinafter the '324 patent), which is hereby incorporated by reference, utilizes additional films coated on the silicon-side conductive layer to reduce flicker. The types of additional films which can be commercially applied on the silicon-side of a silicon-backed microdisplay are, however, limited by the nature of the silicon-side conductive layer, as well as by the need to provide predetermined transmissive and reflective optical properties on the silicon-side of the silicon-backed microdisplay. The approach described in the '324 patent, therefore, may not be capable of adequately reducing flicker. In addition, in the microdisplay described in the '324 patent, the glass-side conductive layer is uncoated, thereby allowing various impurities from subsequent processes to modify its surface properties (e.g., work function) in an uncontrolled manner.

Still needed in the field, therefore, is a silicon-backed microdisplay that provides for reduced flicker and also provides for the protection of its glass-side conductive layer during subsequent processing.

SUMMARY OF THE INVENTION

The present invention provides a silicon-backed microdisplay with reduced flicker and a glass-side conductive layer that is protected during subsequent processing. Silicon-backed nucrodisplays according to the present invention includes a silicon die, a silicon-side conductive layer disposed on the silicon die, and a silicon-side passivation layer disposed on the silicon-side conductive layer. The silicon-baked microdisplay also includes a cover glass, a glass-side conductive layer disposed on the cover glass and a glass-side passivation layer of a predetermined material and thickness disposed on the glass-side conductive layer. Furthermore, liquid crystal material is sandwiched between the glass-side passivation layer and the silicon-side passivation layer in silicon-backed microdisplays according to the present invention.

Visible flicker is suppressed in silicon-backed microdisplays according to the present invention by selecting a glass-side passivation layer material and thickness that improve the work function balance between (i) a combination (i.e. aggregate) of the glass-side conductive layer and the glass-side passivation layer and (ii) a combination (i.e. aggregate) of the silicon-side passivation layer and the silicon-side conductive layer. The glass-side passivation layer materials include, but are not necessarily limited to, $CeO_2$, $In_2O_3$, $MgO$, $SnO_2$, $Ta_2O_5$, $TiO_2$, $Y_2O_3$, $ZnO$, $SiO_2$, $Al_2O_3$, $BeO$ and $MgF_2$. Although the appropriate glass-side passivation layer thickness depends upon the degree of work function balance improvement desired, a typical thickness is in the range of 300 angstroms to 900 angstroms. The presence of a glass-side passivation layer also helps maintain the work function balance by protecting the glass-side conductive layer surface from exposure to impurities.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings, of which.

DETAILED DESCRIPTION OF THE INVENTION

Figure 1:
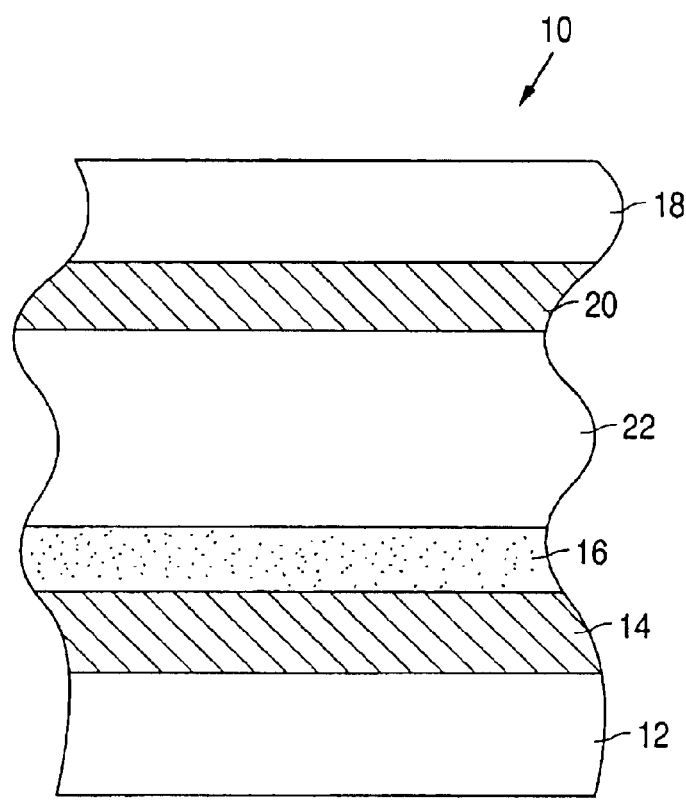
FIG. 1 is a cross-sectional representation of a portion of a conventional silicon-backed microdisplay.
Figure 2:
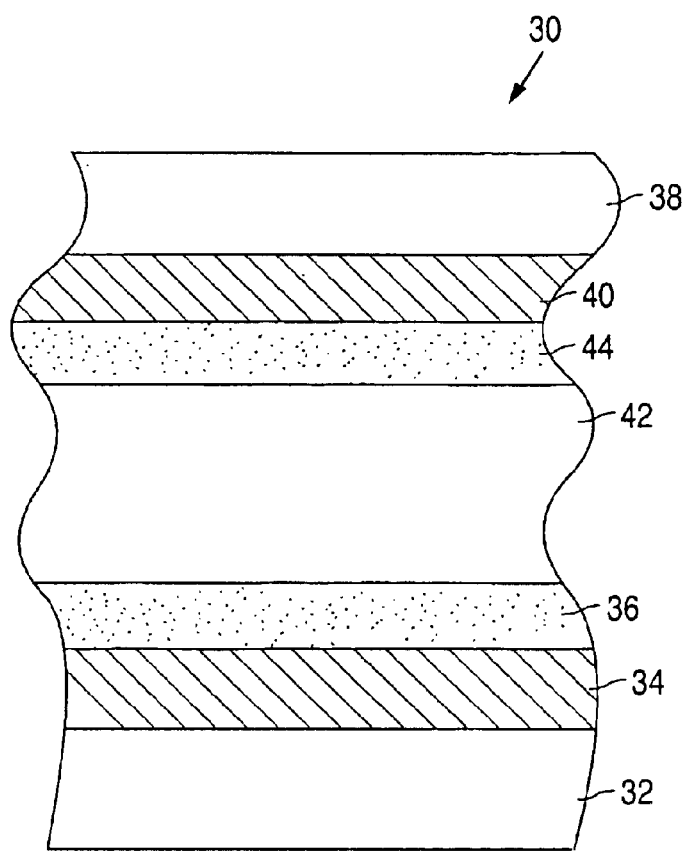
FIG. 2 is a cross-sectional representation of a portion of a silicon-backed microdisplay in accordance with the present invention.

A portion of a representative silicon-backed microdisplay 30 according to the present invention is illustrated in cross-section in FIG. 2. Silicon-backed microdisplay portion 30 includes a silicon die 32, a silicon-side conductive layer 34 disposed on the silicon die 32, and a silicon-side passivation layer 36 disposed on the silicon-side conductive layer 34. Silicon-backed microdisplay portion 30 also includes a cover glass 38, a glass-side conductive layer 40 disposed on the bottom surface of the cover glass 38 and a glass-side passivation layer 44 disposed on the glass-side conductive layer 40. A uniform gap between the silicon-side passivation layer 36 and the glass-side passivation layer 44 is filled with liquid crystal material 42.

Silicon-side conductor layer 34 can be a conventional silicon-side conductive layer, such as an aluminum layer, produced during fabrication of silicon die 32. Silicon-side passivation layer 36 typically includes a silicon dioxide ($SiO_2$) layer in combination with silicon nitride ($Si_3N_4$) layer, and is formed using methods well known to one skilled in the art. The total thickness of the silicon-side passivation layer 36 is typically in the range of 2,000 angstroms to 6,000 angstroms.

Cover glass 38 can be produced from commercially available cover glass material, such as optical-grade, borosilicate glass manufactured by Corning. A typical thickness range for the cover glass 38 is 0.5 mm to 1.1 mm. Glass-side conductive layer 40 is typically formed of a material that includes indium-tin-oxide (ITO), has a characteristic resistance in the range of 100 ohms/square to 500 ohms/square, and a light transmissivity of 90% or greater. The glass-side conductive layer 40 can be formed on the cover glass 38 using, for example, evaporative or sputtering techniques well known in the art. Liquid crystal material 42 is a commercially available mixture whose composition is proprietary to the various commercial suppliers.

The material and thickness of the glass-side passivation layer 44 are predetermined to improve the work function balance between (i) the combination (i.e. aggregate) of the glass-side passivation layer and the glass side conductive layer and (ii) the combination (i.e. aggregate) of the silicon-side passivation layer and the silicon-side conductive layer. Therefore, the glass-side passivation layer 44 must be of a material and a thickness that will beneficially affect the work function of the glass-side conductive layer 40 when combined with that layer. For example, if the combination of the silicon-side passivation layer and the silicon-side conductive layer has a work function of 4.5 eV, and if the glass-side conductive layer alone has a work function of 4.8 eV, then a glass-side passivation layer material and thickness are selected so that the work function for the combination of the glass-side passivation layer and the glass-side conductive layer becomes closer to 4.5 eV than 4.8 eV. In other words, the objective is to use the glass-side passivation layer to modify the work function of the glass-side conductive layer in such a manner that the work function of the combination of the glass-side conductive layer and the glass-side passivation layer is close enough to the work function of the combination of the silicon-side passivation layer and the silicon-side conductive layer that the flicker is no longer visible.

Exemplary materials from which a selection can be made for the glass-side passivation layer 44, and their estimated work functions (listed in parenthesis), include $CeO_2$ (4.021 eV), $In_2O_3$ (3.946 eV), $MgF_2$ (4.102 eV), MgO (4.102 eV), $SnO_2$ (4.145 eV), $Ta_2O_5$ (4.153 eV), $TiO_2$ (4.323 eV), $Y_2O_3$ (3.776 eV), ZnO (3.814 eV), $SiO_2$ 3.983 eV, $Al_2O_3$ (alumina, 4.442 eV) and BeO (4.480 eV).

It is preferred that the glass-side passivation layer thickness be thin enough that an electrical bias applied between the silicon die and the cover glass is not noticeably affected. A typical thickness for the glass-side passivation layer 44 in silicon-backed microdisplays according to the present invention is in the range of 300 angstroms to 900 angstroms. It is also preferred that the selection of a glass-side passivation layer material and thickness result in a combination of the glass-side passivation layer and the glass side conductive layer with an overall transmissivity of greater than 90% and a reflectivity of less than 1%.

It is believed that visible flicker in silicon-backed microdisplays is due, at least in part, to differences in the electrical characteristics (for example, the electromotive force, the ability to gather and give-off electrons) of the silicon-side conductive layer surface and the glass-side conductive layer surface. Visible flicker is, therefore, related to each of these surfaces' work function and to the difference between the respective work functions (i.e., the work function balance).

Moreover, the inventors have established that an improved work function balance (i.e., reducing the difference in the work functions) between the combination of the glass-side conductive layer and the glass-side passivation layer and the combination of the silicon-side conductive layer and the silicon-side passivation layer will reduce visible flicker in a silicon-backed microdisplay. This reduction in visible flicker was established using light meter-based, quantitative flicker measurements of silicon-backed microdisplays according to the present invention operated under controlled conditions.

The work functions for various materials are typically estimated using blocks of material measured in a vacuum. However, relatively thin layers of materials that are disposed on other materials inherently behave differently from blocks of material, since the relatively thin layers are influenced by what is on top of them and what is underneath them. In addition, work functions are very difficult to measure since the conventional measurement techniques often produce more measurement error than the small differences in work function that are of interest. Therefore, measurements of the actual work function balance for silicon-backed microdisplays according to the present invention are not readily made. It is believed, however, that the work function balance for a conventional silicon-backed microdisplay is in the range of approximately 0.3 eV to 0.5 eV. And, it is postulated, without being bound, that silicon-backed microdisplays according to the present invention improve the conventional work function balance by at least 0.1 eV to 0.2 eV.

Glass-side conductive layers, such as those formed of indium-tin-oxide (ITO), can be easily oxidized or etched by other chemicals or impurities, including those that are used in the manufacture of microdisplays or are present in the liquid crystal material. In addition to improving work function balance, the glass-side passivation layers of the present invention provide the benefit of protecting the glass-side conductive layer surface from uncontrolled modification due to exposure to chemicals or impurities during manufacture or operation of the silicon-backed microdisplay.

It should be understood that various alternatives to the embodiments of the invention described herein may be employed in practicing the invention. It is intended that the following claims define the scope of the invention and that structures within the scope of these claims and their equivalents be covered thereby.

What is claimed is:

1. A silicon-backed microdisplay structure formed on a silicon substrate, the structure comprising:

a silicon-side conductive layer formed directly on the silicon substrate;

a silicon-side passivation layer 2000–6000 angstroms thick formed directly on the silicon-side conductive layer;

a cover glass sheet;

a glass-side conductive layer formed directly on the cover glass sheet;

a glass-side passivation layer formed directly on the glass-side conductive layer; and liquid crystal material disposed directly between the glass-side passivation layer and the silicon-side passivation layer;

the glass-side passivation layer being about 300–900 angstroms thick and comprising a material selected from the group consisting of $CeO_2$, $In_2O_3$, $MgO$, $SnO_2$, $Ta_2O_5$, $TiO_2$, $Y_2O_3$, $SiO_2$, $ZnO$, $Al_2O_3$, $BeO$, $MgF_2$ and combinations thereof, such that the work function balance of said silicon-backed microdisplay structure is in the range of approximately 0.2 eV to 0.4 eV.

2. A silicon-backed microdisplay structure as in claim 1, and wherein the silicon-side conductive layer comprises aluminum.

3. A silicon-backed microdisplay structure as in claim 1, and wherein the silicon-side passivation layer comprises a silicon dioxide layer in combination with a silicon nitride layer.

4. A silicon-backed microdisplay structure as in claim 1, and wherein the glass-side conductive layer comprises Indium-tin oxide (ITO), has a characteristic resistance in the range of 100–500 ohms/square and a light transmissivity of 90% or greater.

5. A silicon-backed microdisplay structure as in claim 1, and wherein the combination of the glass-side passivation layer and the glass-side conductive layer has an overall transmissivity of 90% or greater and a reflectivity of less than 1%.

* * * * *